(12) United States Patent
Squicciarini

(10) Patent No.: US 12,187,230 B1
(45) Date of Patent: Jan. 7, 2025

(54) CENTER CONSOLE TO CARGO AREA STORAGE SYSTEM FOR A SPORT UTILITY VEHICLE OF EMERGENCY RESPONDERS

(71) Applicant: Robert Squicciarini, Myrtle Beach, SC (US)

(72) Inventor: Robert Squicciarini, Myrtle Beach, SC (US)

( * ) Notice: Subject to any disclaimer, the term of this patent is extended or adjusted under 35 U.S.C. 154(b) by 355 days.

(21) Appl. No.: 17/577,478

(22) Filed: Jan. 18, 2022

Related U.S. Application Data

(60) Provisional application No. 63/139,862, filed on Jan. 21, 2021.

(51) Int. Cl.
*B60R 7/04* (2006.01)
*B60R 7/14* (2006.01)
*B62D 65/14* (2006.01)

(52) U.S. Cl.
CPC .............. *B60R 7/04* (2013.01); *B60R 7/14* (2013.01); *B62D 65/14* (2013.01)

(58) Field of Classification Search
CPC .. B60R 7/04; B60R 7/14; B60R 5/045; B60R 21/026; B60R 5/006; B62D 65/14
USPC ................................. 296/24.34, 37.8, 57.1
See application file for complete search history.

(56) References Cited

U.S. PATENT DOCUMENTS

| | | | |
|---|---|---|---|
| 4,573,731 A | 3/1986 | Knaack | |
| 4,733,901 A * | 3/1988 | Okuyama | B60N 2/79 296/37.16 |
| 4,941,702 A * | 7/1990 | Southward | B62D 47/003 296/190.08 |
| 5,094,375 A | 3/1992 | Wright | |
| 5,441,183 A | 8/1995 | Frenzel | |
| 5,492,257 A | 2/1996 | Demick | |

(Continued)

FOREIGN PATENT DOCUMENTS

| | | | |
|---|---|---|---|
| DE | 20008579 U1 * | 8/2000 | .......... B60R 21/026 |
| DE | 10335292 A1 * | 2/2005 | ............... B60N 2/01 |

(Continued)

OTHER PUBLICATIONS

Press Fit Forces Stress Design Calculator, Jun. 18, 2018, available at: www.engineersedge.com/calculators/machine-design/press-fit/press-fit.htm.

(Continued)

*Primary Examiner* — Pinel E Romain
(74) *Attorney, Agent, or Firm* — Thomas A. O'Rourke; James Bongiorno; O'Rourke IP Law, PLLC

(57) ABSTRACT

A storage system for retrofit in police SUVs includes: an enclosure, and front and rear access panels. The plurality of walls of the enclosure create an elongated box shape, with a first end near the front row seats, and second end terminating at the rear cargo area. The walls create a forward opening providing access into a forward enclosure portion from the front row seats; and a rear opening providing access into a rear enclosure portion from the rear cargo area, which openings are releasably enclosed/sealed by the access panels, which are secured using a compression latch to prevent rattling. The enclosure's length permits storing of a shotgun. The storage system also includes: drawers in the rear portion that slide out the rear opening into the rear cargo area; and a tray in the front portion that slides out the forward opening and supports a computer.

12 Claims, 14 Drawing Sheets

(56) References Cited

U.S. PATENT DOCUMENTS

| | | | |
|---|---|---|---|
| 5,501,384 | A | 3/1996 | Wisniewski |
| 5,526,972 | A | 6/1996 | Frazier |
| 5,603,439 | A | 2/1997 | Pineda |
| 5,979,725 | A | 11/1999 | Lehrman |
| 6,135,529 | A | 10/2000 | De Angelis |
| 6,138,883 | A | 10/2000 | Jackson |
| 6,244,648 | B1 | 6/2001 | Gackstatter |
| 6,338,518 | B1 | 1/2002 | D'Annunzio |
| 6,644,526 | B2 | 11/2003 | Pegorier |
| 6,733,060 | B1 | 5/2004 | Pavkov |
| 6,766,927 | B1 * | 7/2004 | Cart ............ B60R 7/14 |
| | | | 224/571 |
| 6,874,667 | B2 | 4/2005 | Dykstra |
| 7,104,580 | B2 | 9/2006 | Clark |
| 7,114,755 | B1 | 10/2006 | Sturt |
| 7,258,381 | B2 | 8/2007 | Sturt |
| 7,370,898 | B2 | 5/2008 | Sturt |
| 7,416,235 | B2 | 8/2008 | Rajappa |
| 7,431,365 | B2 | 10/2008 | Sturt |
| 7,445,261 | B2 | 11/2008 | Joler |
| 8,376,435 | B2 * | 2/2013 | Dexter ............ B60N 2/305 |
| | | | 296/64 |
| 8,474,897 | B1 | 7/2013 | Jackson |
| 8,651,351 | B2 | 2/2014 | Fowler |
| 8,888,147 | B2 | 11/2014 | Blanck |
| 8,894,120 | B2 * | 11/2014 | Lechkun ............ B60R 7/04 |
| | | | 296/37.8 |
| 10,137,841 | B1 * | 11/2018 | Neag ............ B60N 2/3047 |
| 10,232,790 | B1 * | 3/2019 | Adrain ............ B60R 7/14 |
| 10,501,020 | B1 | 12/2019 | Hickman |
| 10,676,137 | B2 * | 6/2020 | Bollinger ............ B62D 25/20 |
| 11,279,293 | B2 * | 3/2022 | Razvi ............ B60R 7/04 |
| 2006/0097021 | A1 | 5/2006 | Stanton |
| 2008/0061543 | A1 * | 3/2008 | Gardner ............ B60R 5/041 |
| | | | 280/769 |
| 2010/0078954 | A1 | 4/2010 | Liu |
| 2019/0193651 | A1 * | 6/2019 | Salewski ............ B60N 3/106 |
| 2020/0055423 | A1 * | 2/2020 | Prozzi ............ B60R 7/04 |
| 2021/0253012 | A1 * | 8/2021 | Bursch ............ B60N 3/104 |
| 2023/0391273 | A1 * | 12/2023 | Thomas ............ B60R 7/04 |

FOREIGN PATENT DOCUMENTS

| | | | | |
|---|---|---|---|---|
| FR | 3092165 | A1 * | 7/2020 | ......... B60R 13/0243 |
| JP | H11115635 | A | 4/1999 | |

OTHER PUBLICATIONS

"Three General Types of Fit," available at www.mmto.org/dclark/Reports/Encoder%20Upgrade/fittolerences%20%5BRead-Only%5D.pdf., Jul. 8, 2019.

"Engineering Fit," available at: https://en.wikipedia.org/wiki/Engineering_fit, Jul. 8, 2019.

* cited by examiner

CENTER CONSOLE TO CARGO AREA STORAGE SYSTEM FOR A SPORT UTILITY VEHICLE OF EMERGENCY RESPONDERS

CROSS REFERENCES TO RELATED APPLICATIONS

This application claims priority on U.S. Provisional Application Ser. No. 63/139,862, filed on Jan. 21, 2021, the disclosures of which are incorporated herein by reference.

FIELD OF THE INVENTION

The subject technology relates generally to providing dedicated storage space for equipment in an automotive vehicle, and more particularly to a retrofit kit for a storage system that may occupy particularly space in a sport utility vehicle that is driven and utilized by first responders-police officers, EMS, fire fighters, etc., which retrofit kit may be universally utilized on different vehicles.

BACKGROUND OF THE INVENTION

For emergency responders, having ready access to many different pieces of equipment is essential for the services provided, and many of those pieces of equipment need to be properly stored and adequately secured in the responder's emergency vehicle, such as, for example, a shotgun for law enforcement officers.

One area in a sport utility vehicle that is under-utilized is the center region between the front driver's seat and the front passenger seat. Similarly, the center region in the rear passenger area of the vehicle is very seldom utilized, even if there is a center seat in that rear area. Also, in that rear passenger area for police vehicles, it is sometimes desirable or even necessary to separate one prisoner from another, and that central space may therefore be divided, which may be conveniently accommodated through the placement of a storage system in the space.

The herein disclosed apparatus provides improvements upon certain prior art storage systems to desirably position a Thru-To-Driver (TTD) Cargo and Barrier Storage System to utilize unused space in SUV emergency vehicles.

OBJECTS OF THE INVENTION

It is an object of the invention to provide a storage system for a sport utility vehicle utilized by an emergency responder.

It is another object of the invention to provide a storage system for a sport utility vehicle utilized by an emergency responder that occupies otherwise under-utilized space in the vehicle.

It is a further object of the invention to provide a storage system for a sport utility vehicle utilized by an emergency responder that permits ready access to many different pieces of equipment that are essential for the services provided, including a shotgun.

It is another object of the invention to provide a storage system for a sport utility vehicle that occupies the center region between the front driver's seat and front passenger's seat.

It is also an object of the invention to provide a storage system for a sport utility vehicle that occupies the center region between the front driver and passenger seats, and which storage space is accessible from each of the front seats and the rear seats.

It is another object of the invention to provide a storage system for a sport utility vehicle that occupies the region otherwise occupied by the rear center seat.

It is also an object of the invention to provide a storage system for a sport utility vehicle that extends from the barrier wall of the rear cargo of the SUV to the center region between the front driver's seat and front passenger's seat.

It is another object of the invention to provide a storage system for a sport utility vehicle that will universally fit an array of different sport utility vehicles.

It is also an object of the invention to provide a storage system for a sport utility vehicle that will mount to one or more OEM mounting locations in the vehicle.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A storage system as disclosed herein may be configured for a sport utility vehicle having spaced apart first and second front row seats, a second row seating area, and a rear cargo area. The storage system may include a particularly formed enclosure that is configured to be retrofit into the sport utility vehicle. The enclosure may be formed to include: a plurality of walls having a first end and a second end. The first end of the plurality of walls may be positioned proximate to the front row seats, and the second end of the plurality of walls may be configured to terminate at the rear cargo area, and may terminate at a barrier wall that may separate the rear cargo area from the second row seating area. Note that the barrier wall may be an original equipment manufacturer (OEM) barrier wall, or may be one that is particularly constructed and configured for retrofit into the sport utility vehicle. The first and second side walls are therefore configured to fit between two second-row seats, and may occupy the location of a removed second row middle seat, and to occupy a portion of the center region between the spaced apart first and second front row seats.

The plurality of walls create a forward opening configured to provide access into a forward portion of the enclosure, and the plurality of walls also create a rear opening configured to provide access into a rear portion of the enclosure from the rear cargo area. In one embodiment, the front portion and the rear portion of the enclosure may be interconnected, and in another embodiment, the front and rear portions may be separated by a wall. A first access panel is movable secured to the enclosure and configured to releasably enclose/seal the forward opening when in a closed access panel position, and provides access through the forward opening when in an open access panel position. A second access panel is similarly mounted, and may be used to releasably enclose/seal the rear opening when in a closed position. The first access panel opens in proximity to the front row seats to provide access into the front portion of the enclosure from the front row seats; and the second access panel opens into the rear cargo area to provide access into the rear portion of the enclosure from the rear cargo area. The access panels may be movably mounted in any suitable manner, including, but not limited to, being pivotally mounted, being slidably mounted, etc.

Each the access panels may have a latch secured thereto, with the latch being configured to releasably secure the respective access panel to the plurality of walls of the enclosure when in the closed position. The latch may preferably be a compression latch, which may releasably secure the access panel in the closed position, such that there is no rattling of the panel against the walls due to motion of the vehicle causing interior vibrations.

The plurality of walls of the enclosure may be formed to include: a bottom wall, first and second side walls, and a top wall, where a lower end of the first and second side walls may be configured to respectively extend away from first and second sides of the bottom wall. Also, the top wall may be configured to extend between an upper end of each of the first and second side walls. The bottom wall is configured to mount to a plurality of OEM floor locations of the sport utility vehicle, which may be locations that are available and exposed as a result of removing the center console between the two front row seats, and/or removing of the middle seat of the second row of seats during the retrofit.

The storage system may also include one or more sliding drawers in the front portion and/or the rear portion of the enclosure. The one or more sliding drawers in the front portion of the storage system may be configured to slide out through the front opening, and may slide in proximity to the dash board. The one or more sliding drawers in the rear portion of the storage system may be configured to slide out through the rear opening into the rear cargo area.

The storage system may also include a slidable tray/shelf in the front portion and/or the rear portion of the enclosure. The slidable tray in the front portion of the enclosure may be configured to slide out through the forward opening, and support equipment, including, but not limited to, a computer system used by law enforcement officials.

The front portion of the enclosure may be formed to have a length that may comfortably receive and store a shotgun therein. In another embodiment, at least a portion of the front portion of the enclosure may extend (e.g., overhang) into the rear portion to permit storing of a long-barreled shot gun therein.

Retrofit of the sport utility vehicle may proceed by first removing the center console between the spaced apart first and second front row seats, when a console is positioned thereat, which is common. Next, the middle seat of the second row seating area may be removed. The enclosure of the retrofit kit may be pre-assembled and then be installed in the space, using a plurality of the OEM floor locations that originally supported the center console and/or the middle seat of the second row seating area. Alternatively, the walls of the enclosure may be formed/assembled in place within the sport utility vehicle. The enclosure may be outfitted with drawers, and/or trays as desired, and described above. The access panels may be formed as desired, and mounted to the enclosure as needed.

BRIEF DESCRIPTION OF THE DRAWINGS

The description of the various example embodiments is explained in conjunction with appended drawings, in which.

DETAILED DESCRIPTION OF THE INVENTION

Figure 1A:
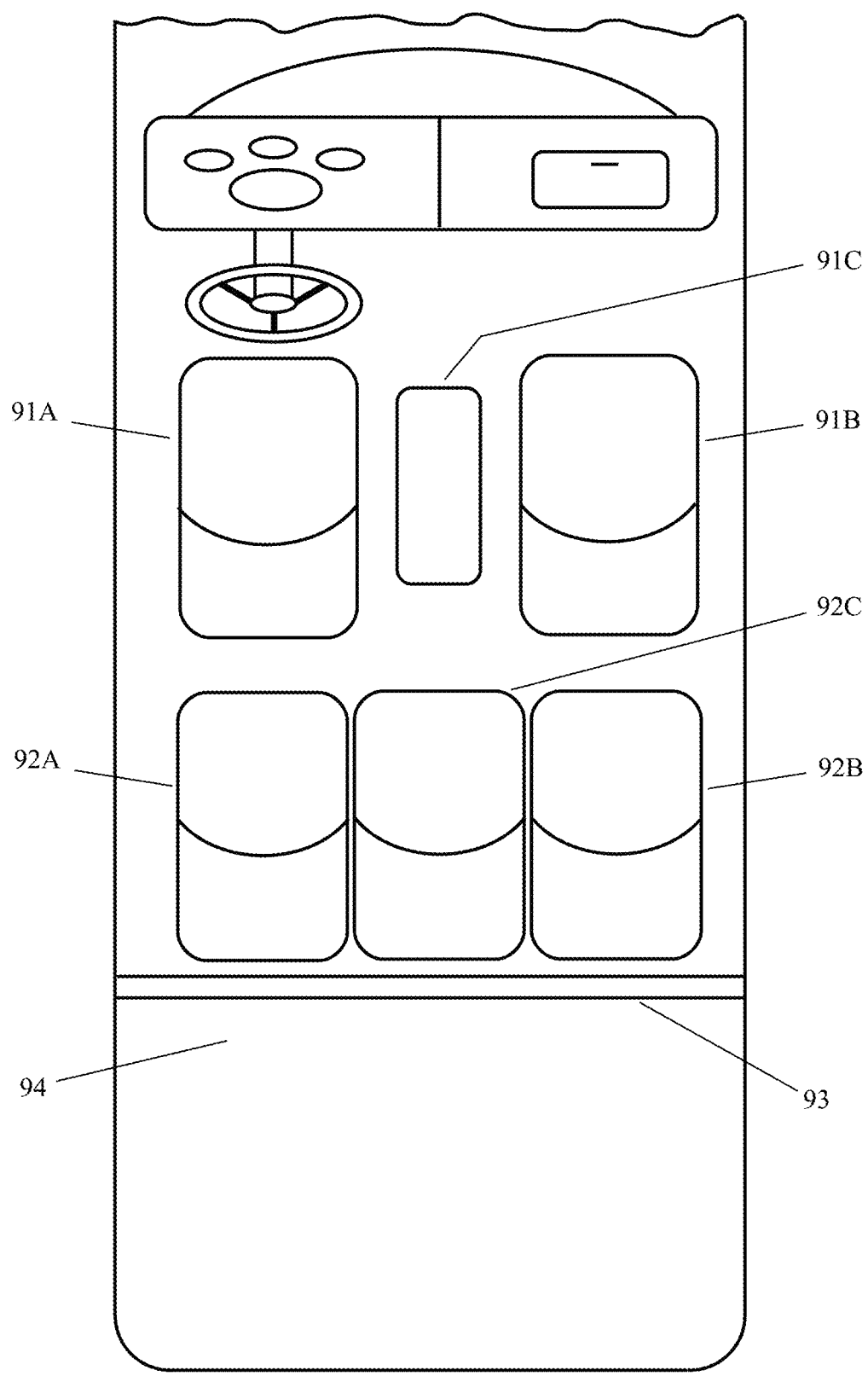
FIG. 1A is a floor plan of a sport utility vehicle, showing the dashboard area, the front row seats, the front row center console, three second row seats, and the rear cargo compartment.

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed and/or claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: https://en.wikipedia.org/wiki/Engineering_fit; and "Three General Types of Fit," available at www.mm-to.org/dclark/Reports/Encoder % 20Upgrade/fittolerences %20%5BRead-Only %5D.pdf.

FIGS. 1-7 show a first embodiment of a storage system 100, which may be formed as a retrofit kit. The storage system 100 may be configured to for provide storage that may extend from a forward portion of the rear cargo area 94, which may have an OEM barrier wall 93 (see FIGS. 1A-1C), up to the center region normally occupied by the center console 91C, which is positioned between the front driver's seat 91A and front row passenger seat 91B. This storage system 100 may replace the space occupied by the center seat 92C of the second row seating, thereby also serving to separate two people who were simultaneously arrested and are positioned to occupy the outermost rear seats 92A and 92B of the second row of the police vehicle.

The storage system 100 may include an enclosure 120, a front access door 130, and a rear access door 140. In another embodiment, the storage system may also include a barrier wall 110 (if one is not present in the vehicle), that separates the cargo area from the second row seating area. Also, in other embodiments, the storage system may alternatively extend from the rear passenger seat bottom region to the center region between the front driver's seat and front passenger's seat, or may alternatively extend from the rear passenger foot rest region up to the center region between the front driver's seat and front passenger's seat (not shown).

Figure 8:
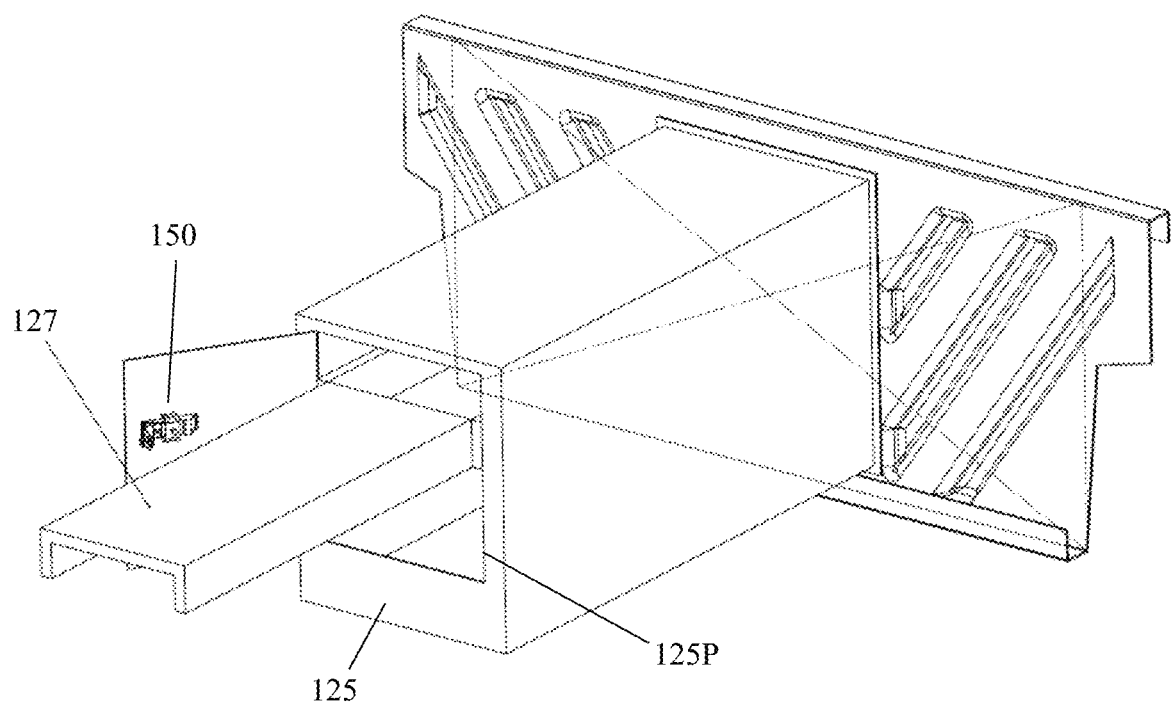
FIG. 8 is a second perspective view showing the storage system of FIG. 7, but is shown after the shelf has been slid into an extended position.

In one embodiment, the barrier wall 110 may be formed to replace the original barrier wall installed in the SUV by the manufacturer of the vehicle, or may alternatively be added to a vehicle that does not have an OEM barrier wall. The enclosure 120 may be fixedly secured to, and may extend forward from, the barrier wall 110, as seen in FIG. 1. As seen in FIGS. 3-6, the enclosure 120 may include a first side wall 121, a second side wall 122, a top wall 123, and a bottom wall 124. In one embodiment, the side walls, the top wall and the bottom wall may terminate to form a forward facing opening and a rearward facing opening. In another embodiment, the enclosure 120 may also include a front wall 125, and a rear wall 126, into which openings into the interior of the enclosure may be formed (see e.g., front opening 125P in wall 125 in FIG. 8).

The first side wall 121 and second side wall 122 are preferably spaced apart to fit between the two second-row seats, in the location where a middle seat has been removed. The first side wall 121 and second side wall 122 may each be planar and vertically oriented in the vehicle, or alternative may have some curvature. The enclosure preferably extends far enough forward so that the first side wall 121 and second side wall 122 also fit between the driver's seat and the front row passenger seat. The enclosure may extend as far forward as possible, while maintaining sufficient distance away from the dash board, so that any equipment stored therein (e.g., a shotgun) may nonetheless be easily placed in and removed from the enclosure 120 through the front opening.

The front access door 130 may be pivotally coupled to a portion of the front wall 125 or pivotally coupled to one of the side walls 121/122 of the enclosure 120, and may be a side hinged door. The front access door 130 may seal against an opening in the front wall 125 that is sufficiently sized to provide access to the interior storage space of the front portion of the enclosure 120. (Note, as seen in FIG. 1C, the enclosure may have an interior wall to separate the front portion of the enclosure from the rear portion of the enclosure). The front access door 130 may pivot forward, and may remains clear of the dashboard when pivoted at least 90 degrees, to permit full access to the storage space within the enclosure 120. Alternatively, rather than an access door that pivots about a side hinge, a bi-fold door arrangement may be used, where two smaller door sections are hinged to each other, and one of the door sections is hinged to the enclosure (see e.g., U.S. Pat. No. 6,470,952 to Cline; and see FIG. 11B). In yet another embodiment, there may be a single sliding door or a dual sliding door arrangement (see e.g., U.S. Pat. No. 704,887 to Low).

The rear access door 140 may be similarly coupled to a portion of the rear wall 126 or pivotally coupled to a portion of one of the side walls 121/122 of the enclosure 120. The rear access door 140 may enclose/seal an opening in rear wall 126 that provides access to the interior storage space of the enclosure 120 from the cargo/trunk area of the SUV.

Each of the doors disclosed herein may utilize a compression latch 150 to keep the door in the closed position, without rattling due to the motion of the vehicle. Any suitable compression latch known in the art may be used, including, but not limited to, the compression latches shown by the following U.S. Patent and Patent Application Pub. No. 4,556,244 to Bisbing; U.S. Pat. No. 4,693,503 to Bisbing; 2004/0056488 by Jackson; U.S. Pat. No. 7,360,802 to Schlack; and U.S. Pat. No. 8,186,188 to Brown. The compression latch may be replaced with a locking latch, which may be operated by key. A cam lock may additionally or alternatively be used for added security.

The interior of the enclosure 120 may be completely open, and may receive any equipment that fits within the volume. Alternatively, as seen for the embodiment shown in FIGS. 7-8, the interior of the enclosure 120 may be further customized and may house one or more shelves 127 therein. The shelf 127 may also be configured as a slidable tray, as it may track upon rollers to easily slide forward, out from the interior of the enclosure, and may support, and thereby make available to the emergency responder, any desired piece of equipment. The shelf/tray 127 may be accessible from the front row driver/passenger seats, and may provide added work space and/or a surface to mount or place a laptop, tablet, computer, etc. The space beneath the shelf 127 may be used to store a shotgun (see FIG. 1C), which may be releasably held in place using spring clips (not shown).

Figure 9:
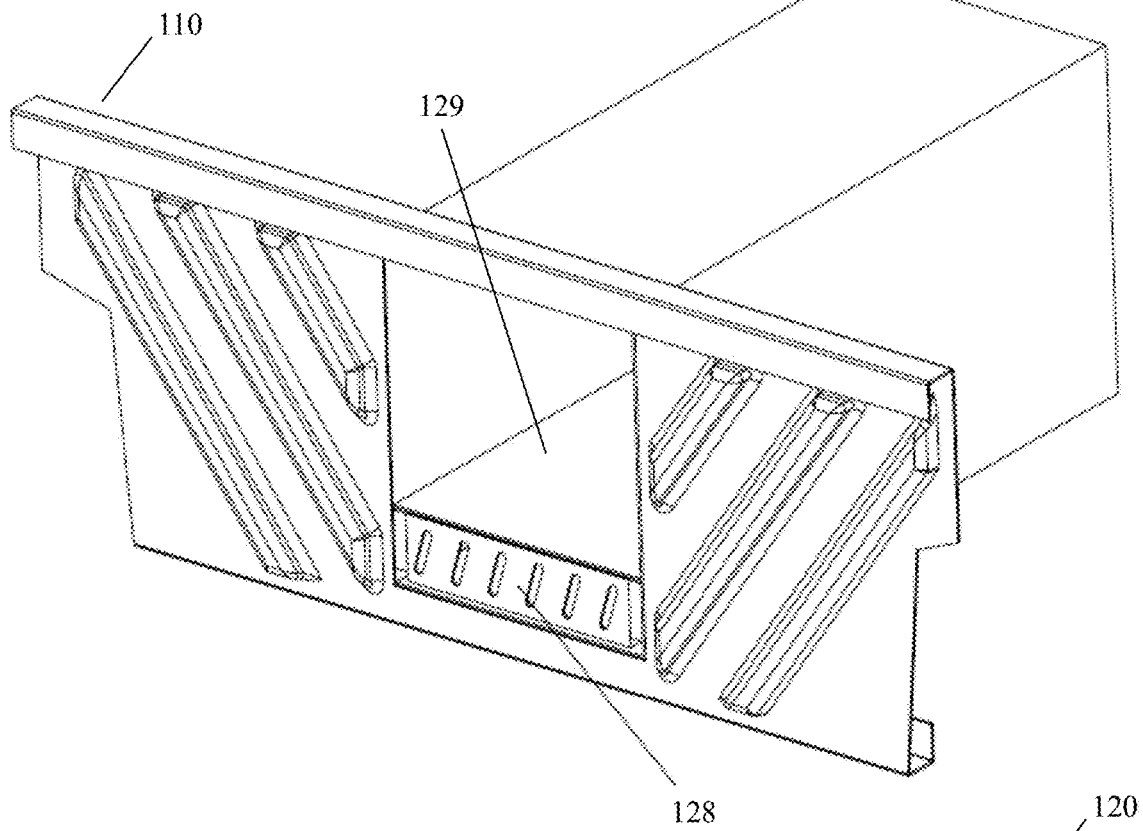
FIG. 9 is a perspective view of a second embodiment of a storage system for a sport utility vehicle utilized by an emergency responder, which storage system includes a slidable drawer in a rear portion of the storage area.
Figure 10:
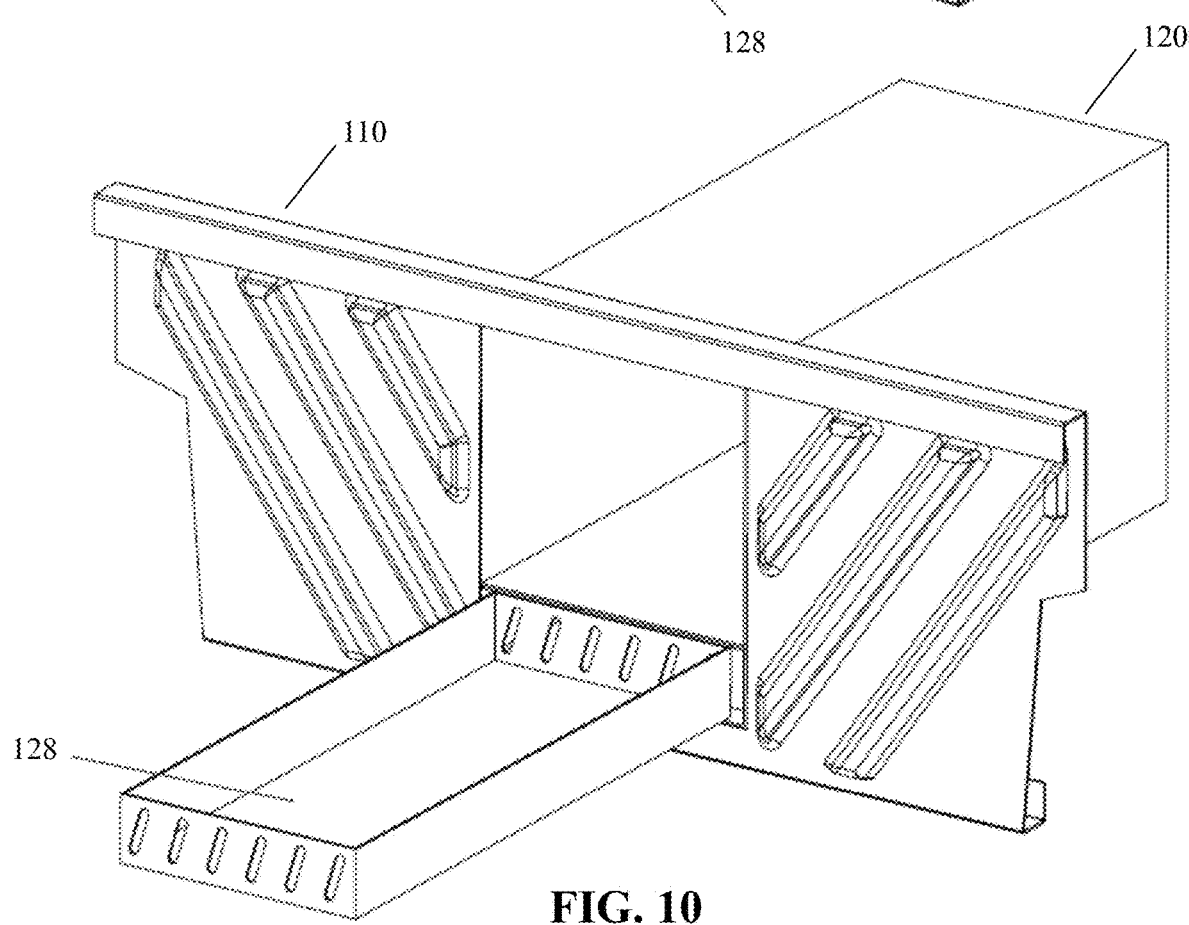
FIG. 10 is a second perspective view of the storage system of FIG. 9, but is shown after the drawer has been slid into an extended position.

Additionally, or alternatively, as seen in FIGS. 9-10, the interior of the enclosure 120 may be further customized to accommodate one or more drawers 128 to house ammunition, weapons, medical equipment, electronics or other equipment, each of which may be configured to be withdrawn out from the rear opening when the rear door 140 is pivoted open. The slides/rollers for the drawer(s) and/or the shelf 127 may be configured to be releasably held at one or more positions, using a latch or a detent arrangement (e.g., U.S. Pat. No. 6,016,594 to Frey), such as: the retracted position, the fully extended position, and one or more intermediate extended positions. The latch or detent may obviate the need for the rear door 140. Where only one drawer may be utilized, as shown in FIGS. 9-10, it may be covered by a fixed interior wall/shelf 129 that may subdivide the enclosed space to create a storage compartment above the drawer.

Figure 11A:
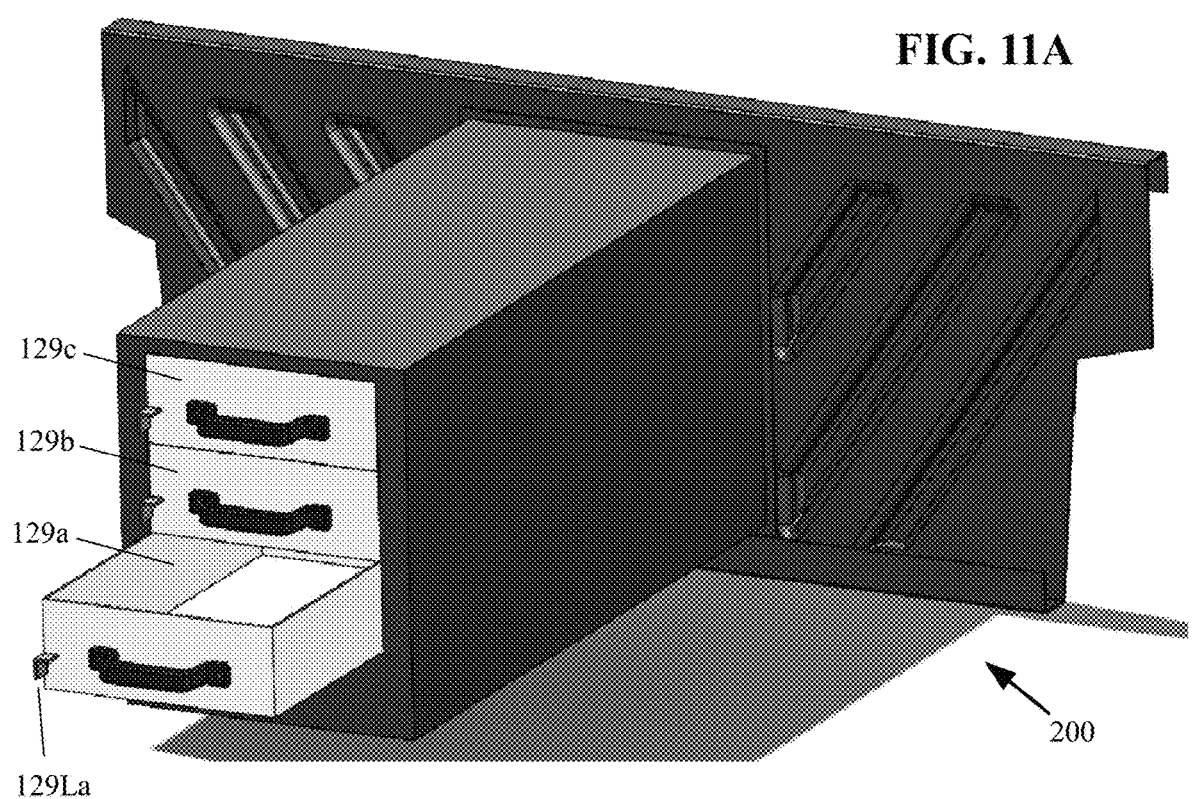
FIG. 11A is a perspective view of a third embodiment of a storage system for a sport utility vehicle utilized by an emergency responder, which storage system includes three stacked slidable drawers in a front portion of the storage area.

In another embodiment, i.e., the storage system 200 shown in FIG. 11A, the front of the enclosure 120 may include a plurality of drawers (e.g., drawer 129a, drawer 129b, and drawer 129c) that may be configured to slide forward out from the interior of the enclosure, and may also be maintained in a retracted position using a corresponding latch (e.g., latch 129La). The front facing drawers are configured to be accessible from the front driver and passenger seats. The drawers may be mounted to fully extend forward when unlatched, and may also be releasably held (e.g., by a detent arrangement) when in the fully extended position, and also when halfway extended forward, to prevent unwanted movement.

Figure 11B:
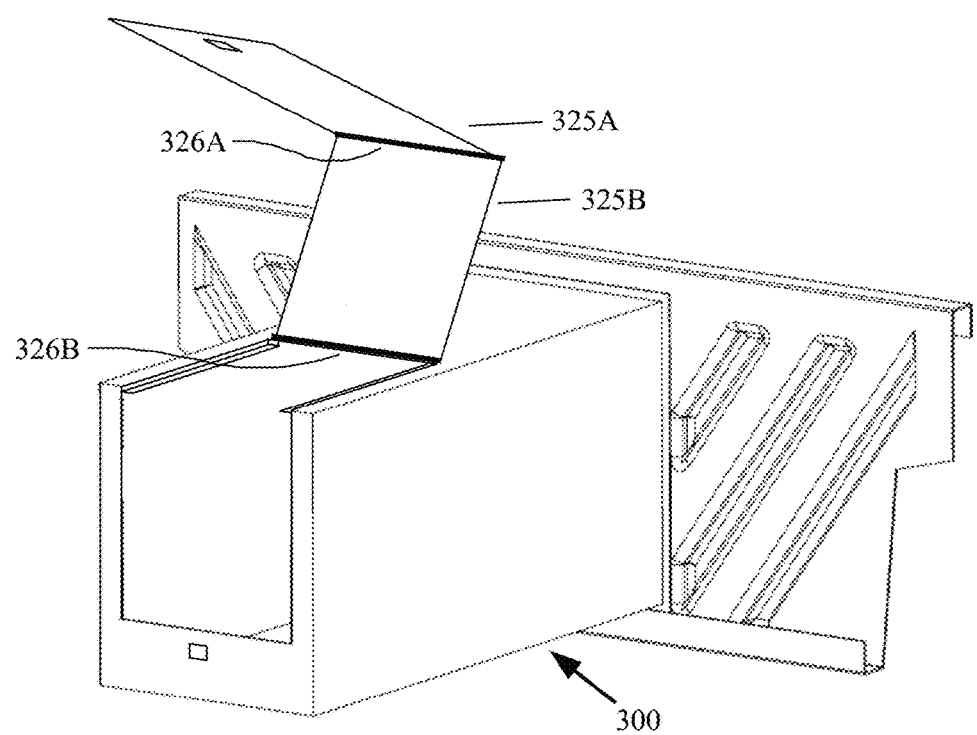
FIG. 11B shows a perspective of another embodiment of a storage system for a sport utility vehicle, in which the front portion of the storage area may be accessed using a dual-pivoting access panel.
Figure 12:
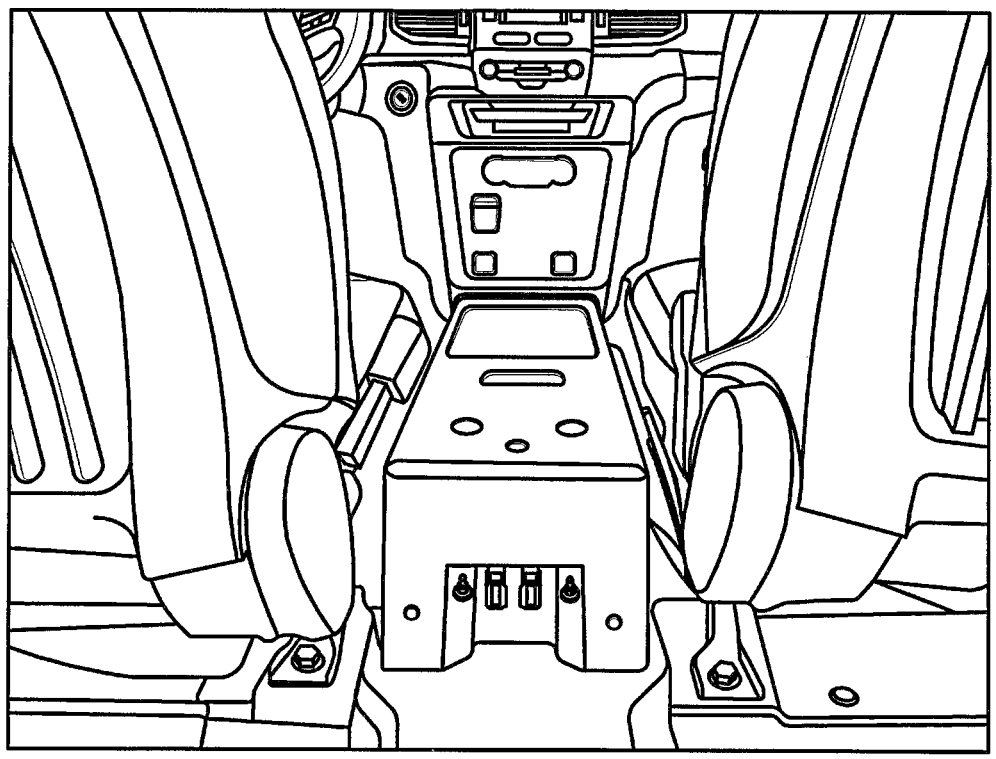
FIG. 12 is a rear perspective view showing the center region between the front driver's seat and front passenger seat, but after a portion of the OEM center console has been removed to expose the underlying structure.
Figure 13:
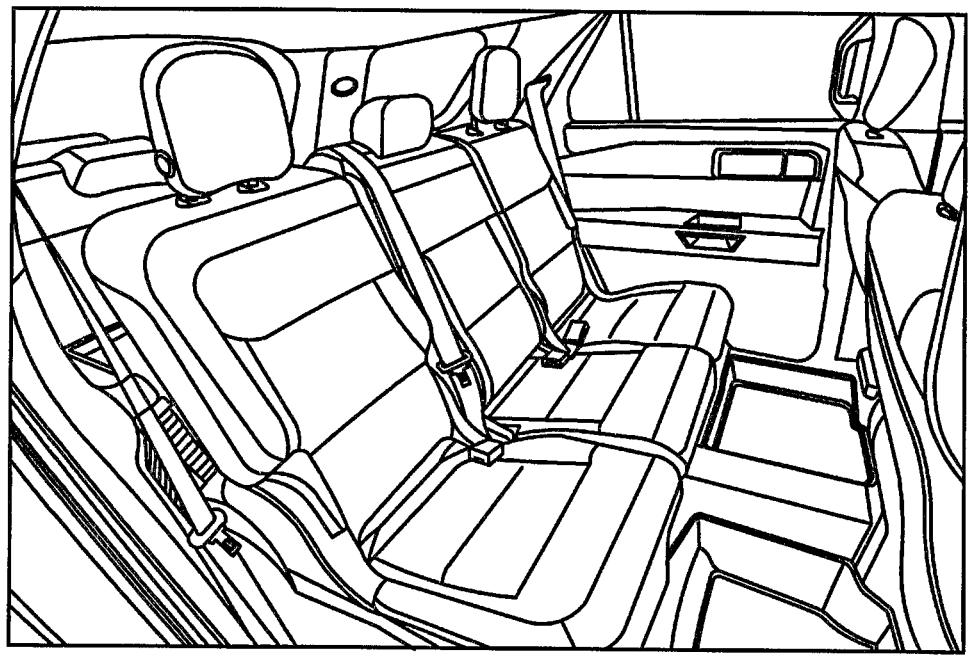
FIG. 13 is a side perspective view showing a factory second row seating area in an SUV that includes a center passenger seat, and left and right side passenger seats.
Figure 14:
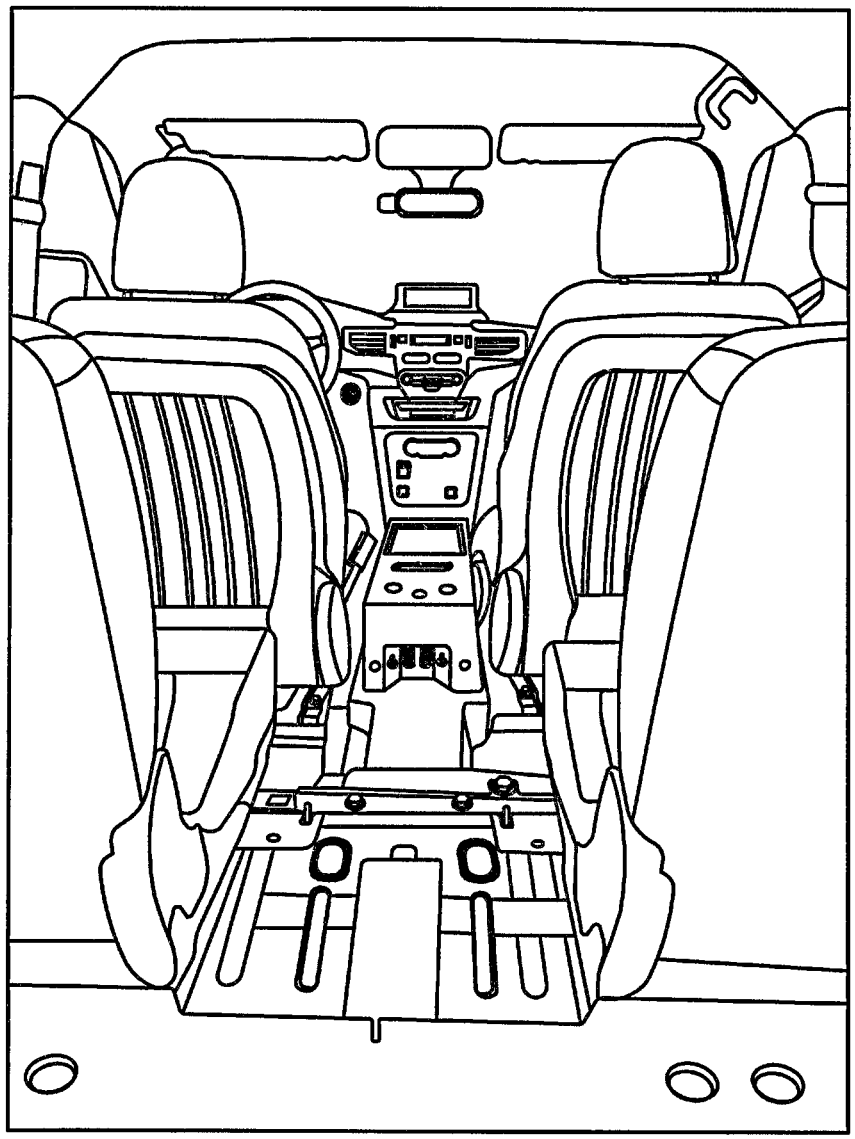
FIG. 14 is a rear perspective view of the factory second row seating compartment shown in FIG. 13, but where the center seat has been removed to expose the underlying structure and OEM mounting locations.
Figure 15:
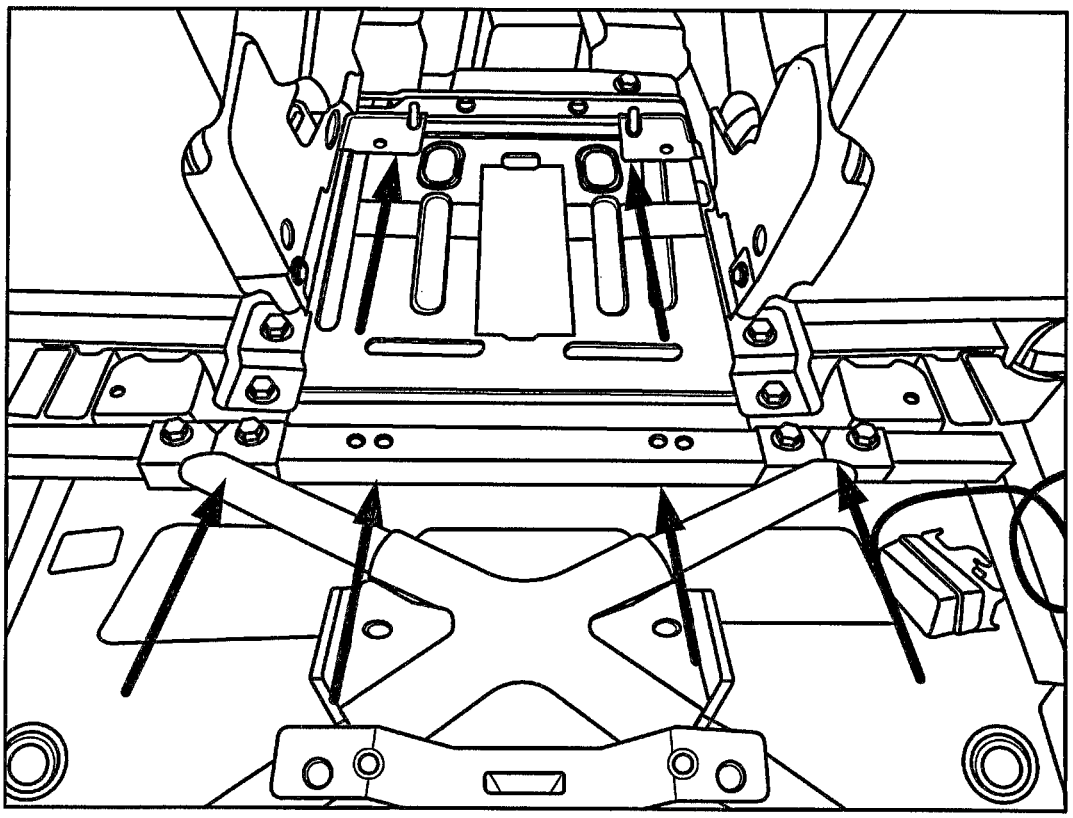
FIG. 15 is the rear perspective view of FIG. 14, but is shown enlarged, and also shown with the carpet and floor board of the cargo area removed to expose the underlying structure, and with OEM mounting locations that may be utilized for the storage system being highlighted therein.
Figure 16:
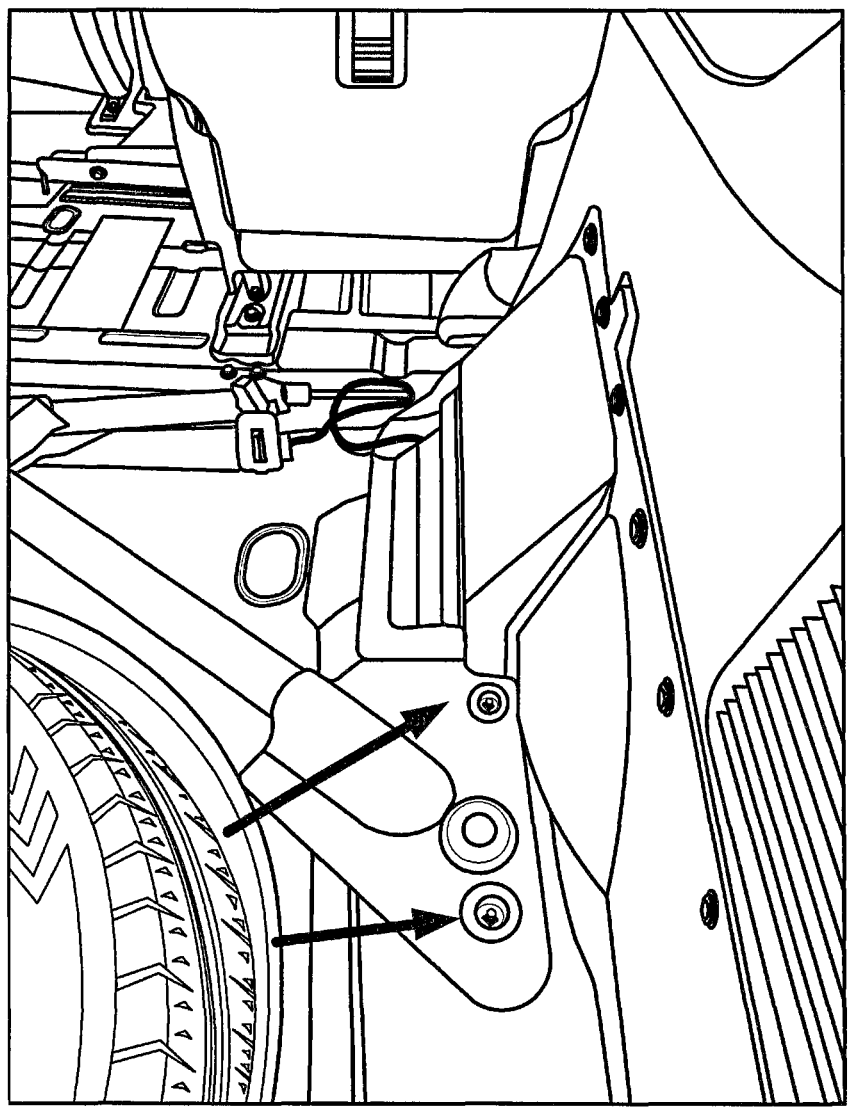
FIG. 16 is a rear perspective view of the exposed underlying structure of the cargo area seen in FIG. 15, but also showing other OEM mounting locations near the spare tire well.

In another embodiment, i.e., the storage system 300 shown in FIG. 11B, the front of the enclosure may be accessed by a pair of access panels 325A/325B that may be pivotally coupled together using hinge 326A, one of which panels may be pivotally coupled to the top of the enclosure using hinge 326B, so that the panels may fold back onto the rear portion of the top wall, exposing both the front of the enclosure and a portion of the top of the enclosure. This two-sided opening may provide generous access for storing a large or a very long object therein.

Figure 1B:
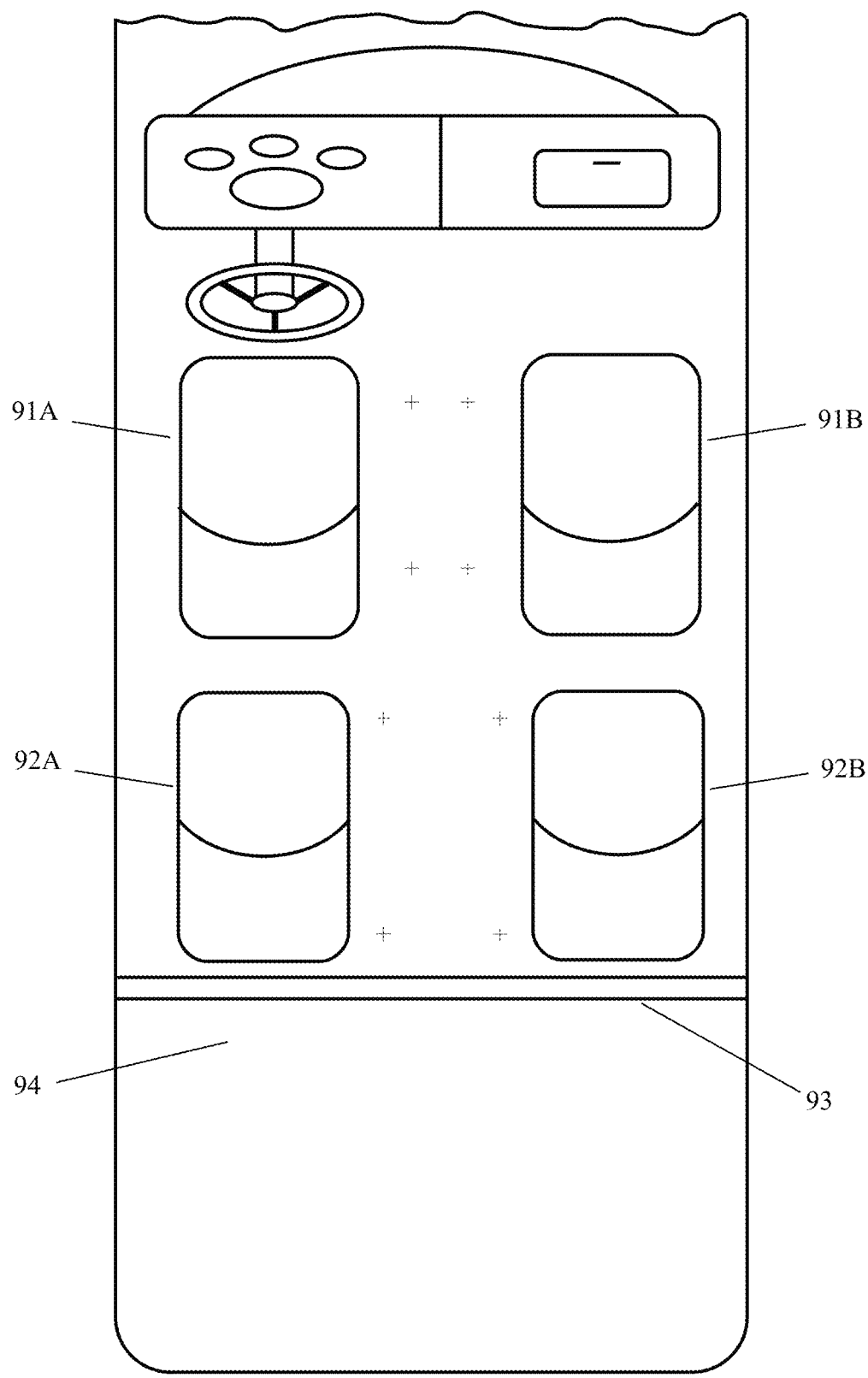
FIG. 1B is the sport utility vehicle floor plan of FIG. 1A, but shown with the center console removed, and with the center seat of the second row also removed, exposing OEM mounting locations with respect to the vehicle body.
Figure 1C:
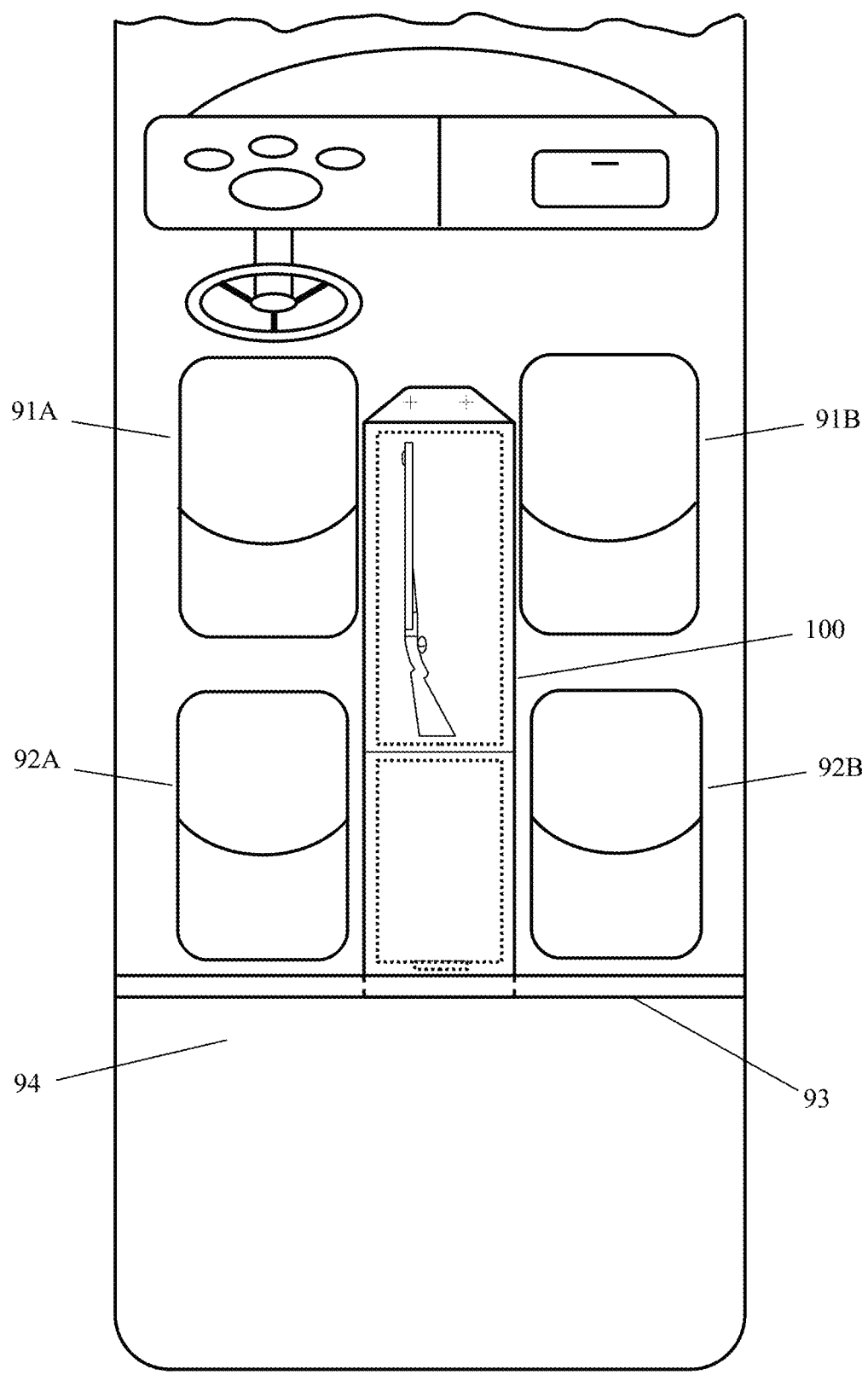
FIG. 1C is the sport utility vehicle floor plan of FIG. 1B, but shown with an embodiment of the herein disclosed storage system installed in the vehicle that extends from the cargo area to the front row seats.
Figure 1:
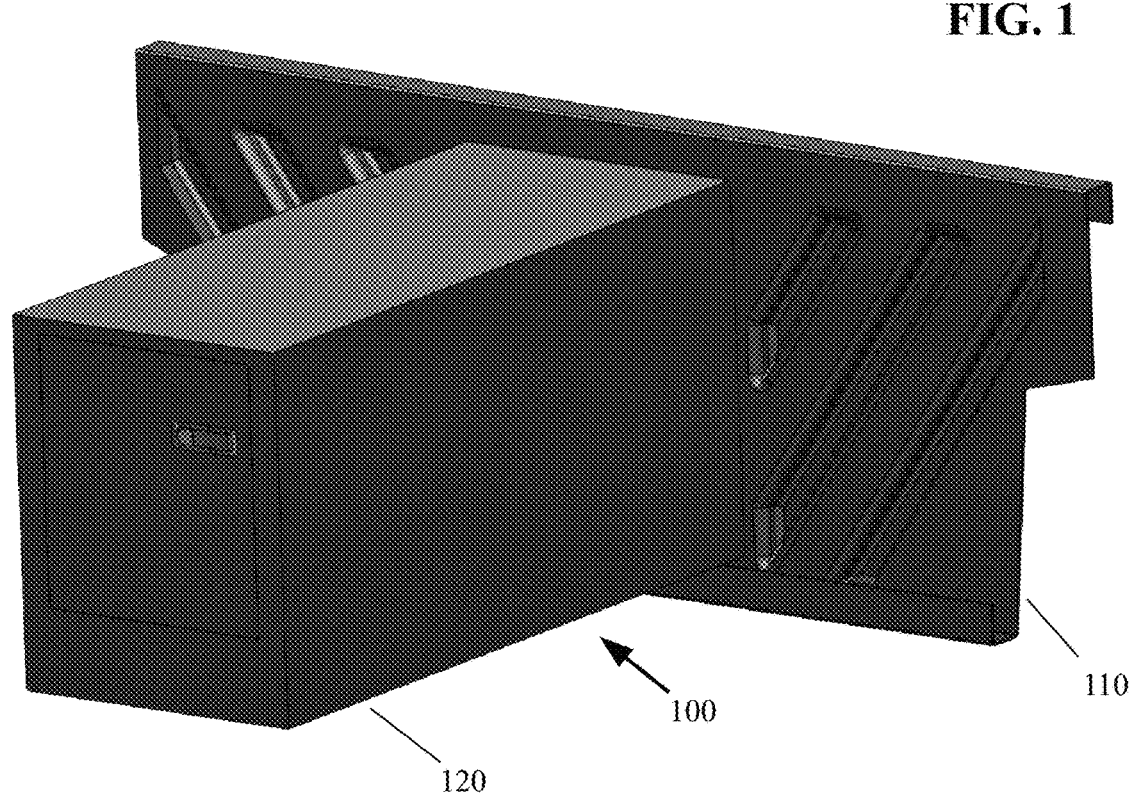
FIG. 1 is a perspective view of a first embodiment of a storage system for a sport utility vehicle utilized by an emergency responder, which storage system extends from the rear cargo barrier to the center region between the front driver's seat and front row passenger's seat.
Figure 2:
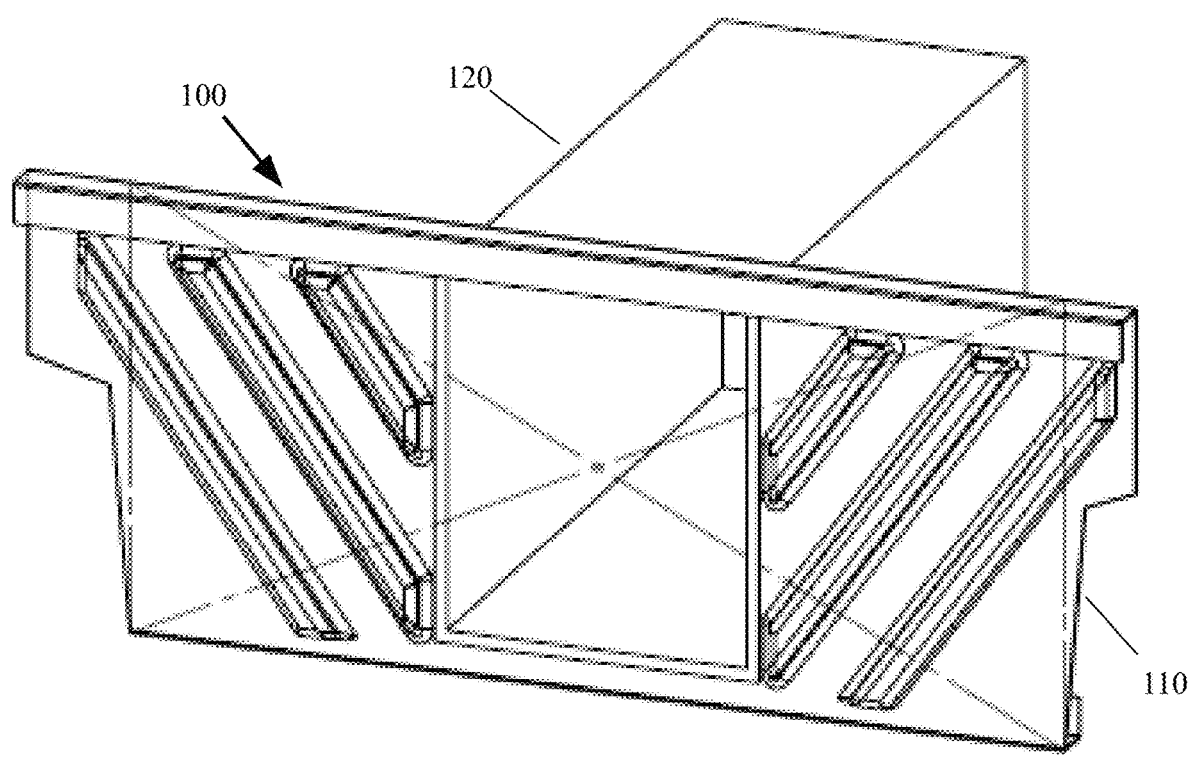
FIG. 2 is a rear perspective view of the storage system of FIG. 1, shown with the rear access door removed.
Figure 3:
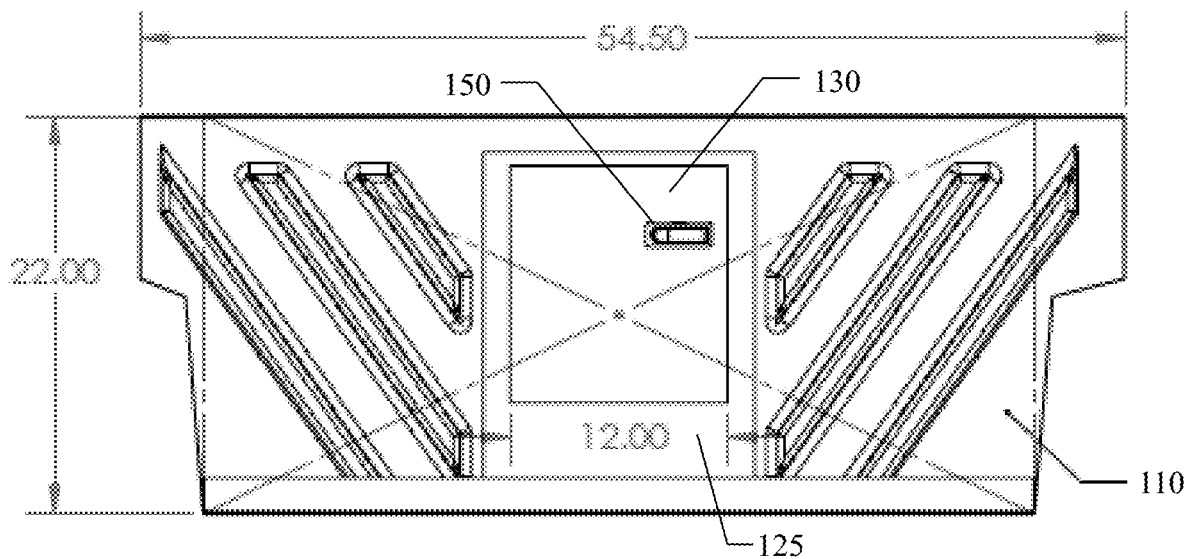
FIG. 3 is a front view of the storage system of FIG. 1.
Figure 4:
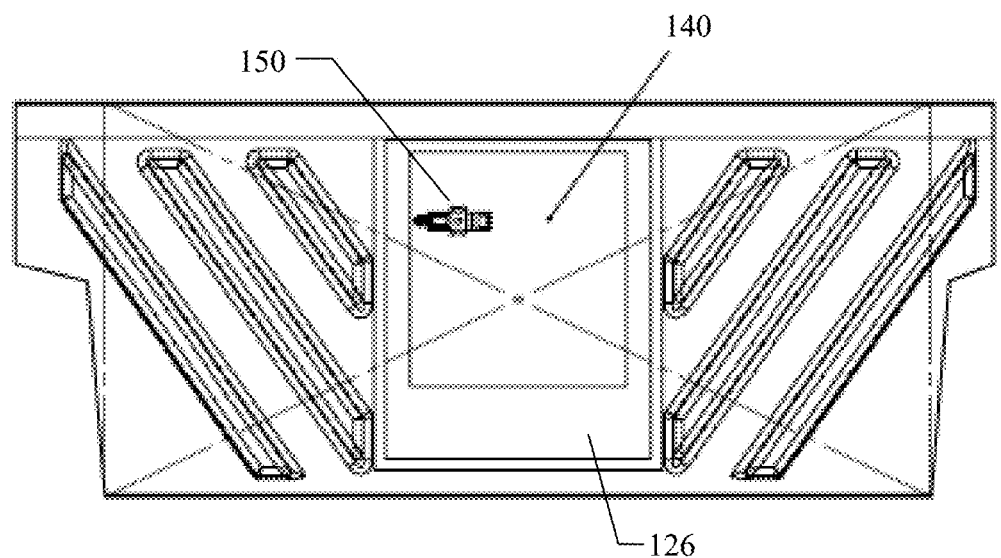
FIG. 4 is a rear view of the storage system of FIG. 1.
Figure 5:
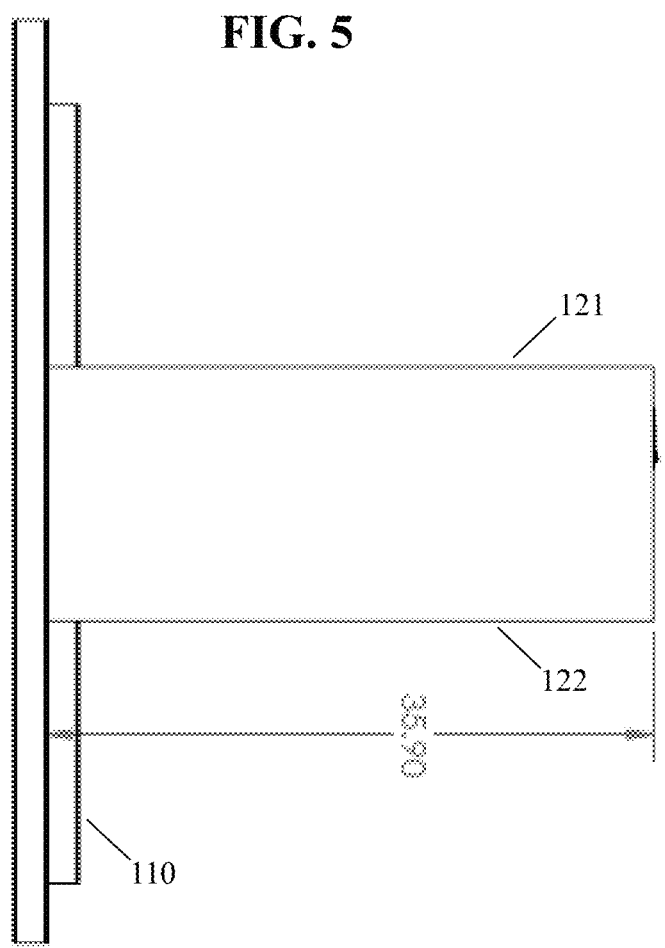
FIG. 5 is a top view of the storage system of FIG. 1.
Figure 6:
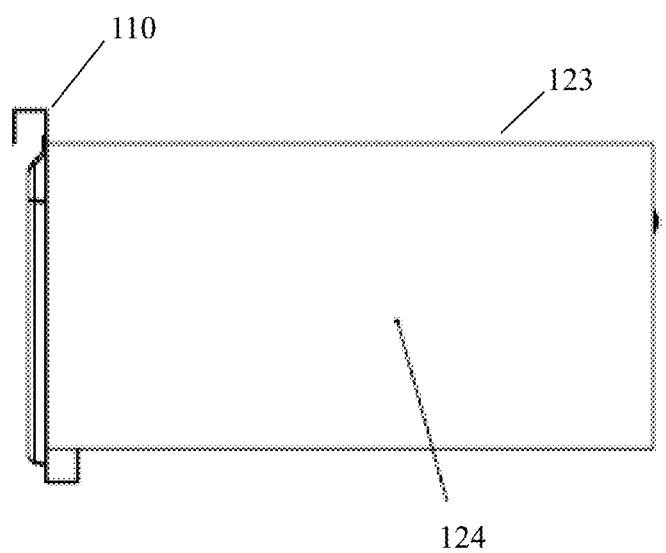
FIG. 6 is a side view of the storage system of FIG. 1.
Figure 7:
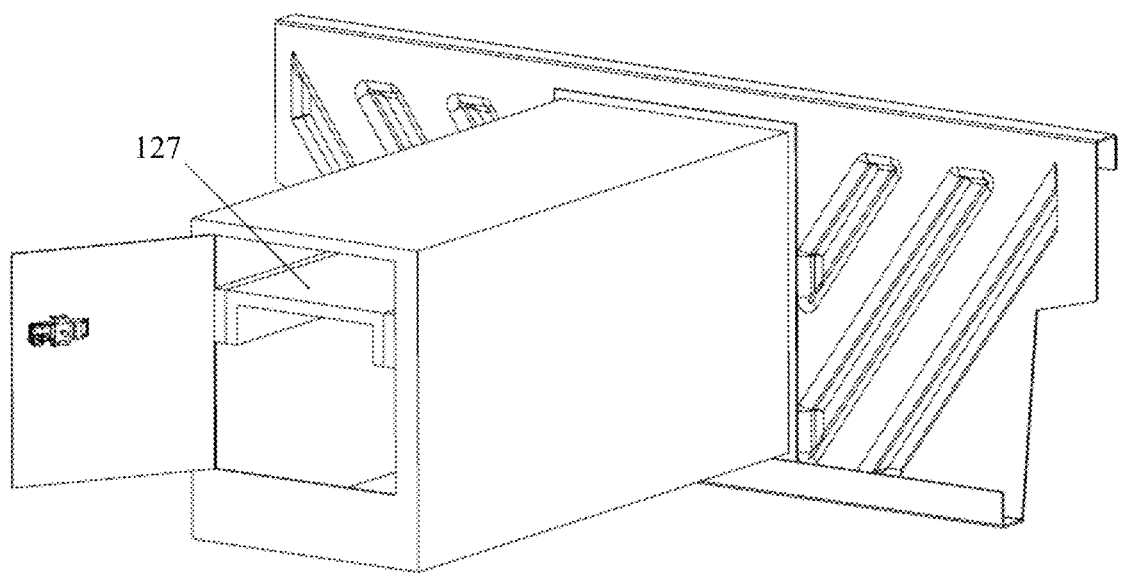
FIG. 7 is a perspective view of a second embodiment of a storage system for a sport utility vehicle utilized by an emergency responder, which storage system includes a slidable shelf in the storage area, and a compression latch for the pivotable access door.

Portions of the enclosure 120 and the barrier wall 110 may each be configured to be fastened to OEM mounting locations of the vehicle, as may be seen in FIG. 1B, and the photographic images of FIGS. 12-16.

While illustrative implementations of one or more embodiments of the disclosed apparatus are provided hereinabove, those skilled in the art and having the benefit of the present disclosure will appreciate that further embodiments may be implemented with various changes within the scope of the disclosed apparatus. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A storage system configured for a sport utility vehicle having spaced apart first and second front row seats, a second row seating area, and a rear cargo area, said storage system comprising:
    an enclosure, said enclosure comprising: a plurality of walls having a first end and a second end; said first end of said plurality of walls positioned proximate to the front row seats; said second end of said plurality of walls configured to terminate at the rear cargo area;
    wherein said plurality of walls create a forward opening configured to provide access into at least a forward portion of said enclosure;
    wherein said plurality of walls create a rear opening configured to provide access into at least a rear portion of said enclosure from the rear cargo area;
    a first access panel, said first access panel configured to releasably enclose said forward opening when in a closed access panel position, and to provide access through said forward opening when in an open access panel position;

a second access panel, said second access panel configured to releasably enclose said rear opening when in a closed position;

wherein said first access panel opens in proximity to the front row seats to provide access into said forward portion of said enclosure from the front row seats; and wherein said second access panel opens into the rear cargo area to provide access into said rear portion of said enclosure from the rear cargo area;

wherein said plurality of walls of said enclosure comprise:
- a bottom wall;
- a first side wall and a second side wall, a lower end of said first and second side walls configured to respectively extend away from first and second sides of said bottom wall; and
- a top wall, said top wall configured to extend between an upper end of each of said first and second side walls;

and wherein said forward portion of said enclosure comprises a length configured to store a shotgun.

2. The storage system according to claim 1,
further comprising: one or more sliding drawers in said rear portion of said enclosure; and
wherein said one or more sliding drawers are configured to slide out through said rear opening into the rear cargo area.

3. The storage system according to claim 2,
further comprising: a slidable tray in said forward portion of said enclosure; and
wherein said slidable tray is configured to slide out through said forward opening.

4. The storage system according to claim 3:
wherein said first access panel comprises: a latch configured to releasably secure said first access panel in said closed position; and
wherein said second access panel comprises: a latch configured to releasably secure said second access panel in said closed position.

5. The storage system according to claim 4:
wherein said latch of said first access panel comprises: a compression latch configured to releasably secure said first access panel in said closed position, without rattling due to motion of the vehicle.

6. The storage system according to claim 5, wherein each of said first access panel and said second access panel are configured to pivotally mount to said enclosure.

7. The storage system according to claim 5, wherein each of said first access panel and said second access panel are configured to slidably mount to said enclosure.

8. The storage system according to claim 1, wherein said bottom wall is configured to mount to a plurality of OEM floor locations of the sport utility vehicle.

9. The storage system according to claim 1, further comprising: a barrier wall configured to separate the cargo area from the second row seating area.

10. The storage system according to claim 9, wherein said first and second side walls are configured to fit between two second-row seats, to occupy a location of a removed middle second row seat.

11. The storage system according to claim 9, wherein said enclosure is configured to extend from said barrier wall to a center region between the spaced apart first and second front row seats.

12. A method of retrofitting a storage system into a sport utility vehicle having spaced apart first and second front row seats, three seats in a second row seating area, and a rear cargo area, said method comprising:

removing a center console between the spaced apart first and second front row seats;

removing a middle seat of the second row seating area;

forming a retrofit kit comprising: an enclosure formed of a plurality of walls having a length configured to extend from the cargo area to between the spaced apart first and second front row seats, and forming a forward opening providing access into a forward portion of the enclosure and a rear opening providing access into a rear portion of the enclosure;

forming the forward portion with a length for accommodating storing of a shotgun therein;

securing the enclosure to the sport utility vehicle at a plurality of OEM floor locations that supported one or more of the center console and the middle seat of the second row seating area;

movably mounting a first access panel to the enclosure for releasably sealing the forward opening when in a closed position; and movably mounting a second access panel to the enclosure for releasably sealing the rear opening when in a closed position.

* * * * *